Figure 1:
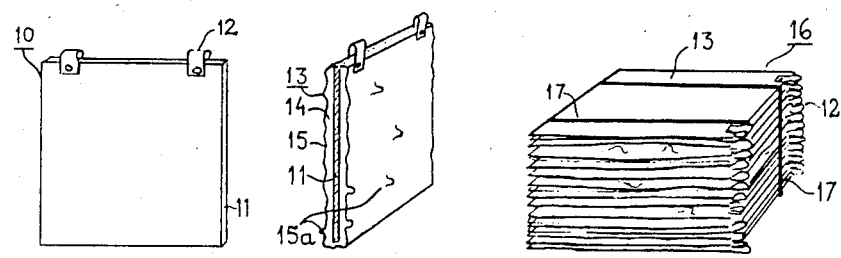

United States Patent [19]

Ludvigsson

[11] Patent Number: 4,555,942
[45] Date of Patent: Dec. 3, 1985

[54] METHOD FOR CONTINUALLY CONTROLLING THE QUALITY OF CATHODE COPPER

[75] Inventor: Björn M. Ludvigsson, Örviken, Sweden

[73] Assignee: Boliden Aktiebolag, Stockholm, Sweden

[21] Appl. No.: 716,599

[22] Filed: Mar. 27, 1985

Related U.S. Application Data

[63] Continuation of Ser. No. 547,357, Oct. 31, 1983, abandoned.

[30] Foreign Application Priority Data

Nov. 10, 1982 [SE] Sweden .............................. 8206396

[51] Int. Cl.[4] ............................................ G01N 9/02
[52] U.S. Cl. .................................................... 73/433
[58] Field of Search .............................. 73/32 R, 433

[56] References Cited

U.S. PATENT DOCUMENTS 3,436,968 4/1969 Unger et al. ........................... 73/433

FOREIGN PATENT DOCUMENTS 290913 5/1928 United Kingdom .................. 73/433

OTHER PUBLICATIONS

Thrush, Paul W., and the Staff of the Bureau of Mines, *A Dictionary of Mining, Mineral, and Related Terms*, U.S. Department of the Interior.
British Non-Ferrous Metals Federation, *Sampling and Analysis of Copper Cathode*, Aug. 26, 1982, 6 pages.
"Density Indicates Soundness", by Bamford, from "The Foundry", May 1, 1924 pp. 352-354.

Primary Examiner—Stewart J. Levy
Assistant Examiner—John E. Chapman, Jr.
Attorney, Agent, or Firm—Nils H. Ljungman

[57] ABSTRACT

The invention relates to a method for controlling or monitoring the quality of copper cathodes. The method is characterized by stacking cathodes to form a bundle, preferably comprising 10-20 cathodes, and by determining the bulk density, or a value related thereto, of the bundle. The bulk volume or mean height of a cathode bundle can be used with great accuracy. Advantageously, the height of each cathode bundle is measured by means of distance-sensing means of the laser or ultrasonic type placed above the movement path of a cathode bundle.

8 Claims, 4 Drawing Figures

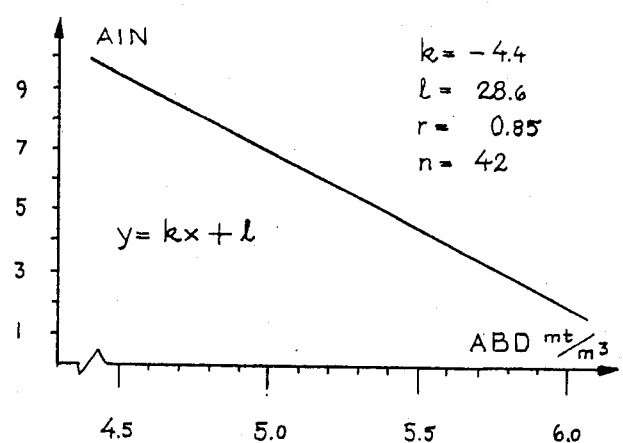
Figure 3. Weakly average values w. 1-42 1982
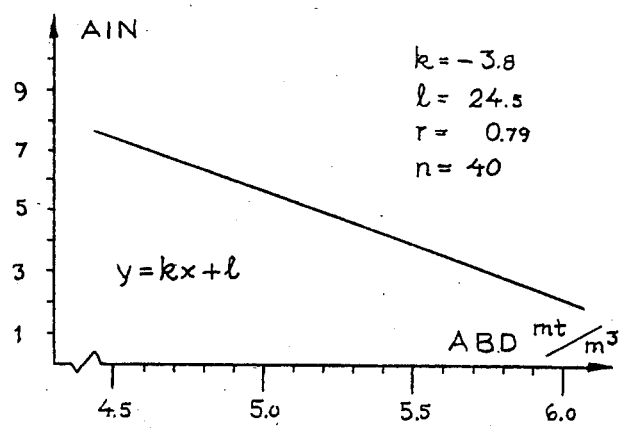
Figure 4. Daily average values 82-08-14 → 82-09-22

METHOD FOR CONTINUALLY CONTROLLING THE QUALITY OF CATHODE COPPER

This is a continuation of U.S. application Ser. No. 547,357 filed Oct. 31, 1983, now abandoned.

The present invention relates to a method for continually controlling or monitoring the quality of cathodes, which may be produced by electrolysis or electro-winning processes. It particular, the invention relates to such quality control as those which can also be used as continuous delivery control and which possess properties which are primarily affected by the level of impurities in the copper.

The quality of produced electrolytic copper varies with the level of impurities in the ingoing copper to the electrolysis process, the so-called anode copper, and also as a result of other factors, such as events taking place during the actual electrolysis. Thus, the ingoing anode copper is electrolyzed in electrolysis tanks containing a copper-sulphate solution acidified with sulphuric acid, by passing through the bath a D.C. (direct current) or P.R.C. (periodic reserve current) having a current density of about 100–500 A/m$^2$. Copper is transported through the electrolyte from the impure anode to a cathode normally made of pure copper and located adjacent to and between the anodes. The cathode may also consist of other material than copper, e.g. titanium and stainless steel. In principle, metals of a more noble character remain insoluble and gradually, as the thickness of the anode is decreased, through the electrolysis, there is formed a sludge containing the said metals, this sludge settling on the bottom of the electrolysis tank. Certain other elements in the copper, such as arsenic, antimony and bismuth, pass into the electrolyte and also form a slime which to a great extent, however, floats on the surface of the electrolyte.

The copper dissolved from the anode is deposited onto the cathode, to form on the cathode plate a layer of copper, the thickness of which layer increases as the electrolysis proceeds. Normally after a period of from 10 to 11 days has lapsed, a fresh cathode plate is placed in the tank and left therein for a further 10–11 days, whereafter both the anodes and the cathodes are stripped from the tank. There are also producers who use shorter or longer periods and even producers who use a single period and thus only one cathode per anode instead of the two cathodes mentioned above. Further there are producers who employ more than two periods and consequently more than two cathodes per anode. The appearance structure of the copper deposit on the cathodes can vary in many ways, this variance in structural appearance being mainly due, inter alia to variations in current density and to the levels of impurities in the system. Also the supply of different inhibitor agents, such as glue and thiourea, has an influence on the surface appearance structure. For example, copper can be precipitated in a more or less compact form, high current densities favoring a powderous precipitate. When the current density is sufficiently low, copper is precipitated in a compact form and builds a uniform metal layer. Current densities of this low magnitude, however, are not often economical, due to the low production rate per area unit. Consequently, with those current densities which can be normally applied in practice, the cathodes seldom have an ideal surface structure or quality. The structural appearance of the cathode surface can thus vary greatly, both with respect to cathodes produced in mutually different electrolysis tanks, e.g. tanks forming part of a tank unit, and with respect to cathodes produced in one and the same tank. Thus, these variances in cathode surface structure are caused by many factors. For example, the cathodes may exhibit pronounced projections, or nodules, of varying size, both on the edges of the cathodes and on the sides thereof facing the anodes. The presence of such nodules on the cathode, and also the deposition thereon of porous spongy copper, is naturally undesirable from the aspect of quality. Furthermore, the customers (the users) prefer the surfaces of the cathodes to be as smooth as possible, so as to facilitate handling of the said cathodes.

It is also known that such nodules and also the precipitation of porous copper grades in its turn, negatively affects the quality of the copper from a contaminating aspect, since inclusions of electrolyte and slime floating therein will occur. Such a nodulated or rough surface also contributes to the adsorption or entrapping of external particle impurities from the environment, such as dust and rust. Nodules on the cathodes will also influence the flow of electricity through the bath and give rise to strong variations within the cross-section of the tank.

As above indicated, copper cathodes can also be produced by electro-winning processes, in which copper is deposited onto the cathode in the same manner as when employing electrolysis processes. However, inert anodes are used instead of copper anodes and the ingoing copper accompanies the electrolyte supplied to the system. The electrolyte is derived from a preceding acid leaching step, in which copper is leached from its ores or various cinders which contain copper. The above disclosure regarding problems of quality is also applicable to electro-winning processes. The quality of electro-winning copper cathodes is rather more sensitive to disturbances and irregularites in the process, e.g. relating to the flow of electrolyte through the tanks and variations in the impurity level of the electrolyte.

For the reasons aforementioned, the task of continually controlling or monitoring the quality of cathode copper is both extremely difficult and complicated. For example, the only direct assessment of the quality of one day's copper production is that obtained when melting the copper, whereupon any quality variations in time and space are equalized to a very high degree, and whereupon the molten copper or the product cast therefrom can be sampled at intervals. For example, an impurity analysis can be carried out with extreme accuracy and in a manner which is representative of the production in question. In addition, other properties characteristic of the quality of the copper produced and directly related to and co-related with the level of impurities in said copper, for example such characteristics as conductivity and recrystallization temperature, can be determined with great accuracy and validity in the analysis.

In recent years, however, development has been directed more towards the continuous casting and rolling of intermediate products, such as rod and wire, using various methods in which copper cathodes constitute the starting material. As a result, the melting down of cathodes and the casting of different products is today mroe often carried out by the metalworkers and by the producers of intermediate products, instead of by the copper producers as was previously the case when wirebars and shapes, such as billets and cast slabs, were the main products of copper producers, the world over. For the reasons before-mentioned the market for wirebars and shapes, however, is slipping heavily, and hence in the future, if not already, cathode copper will be the main product of the copper producers.

Consequently, over the past ten years great efforts have been made to develop cathode-sampling methods and routines which are capable of replacing and which correspond to the previously applied delivery and production quality control carried out on wirebars and shapes.

Sophisticated sampling routines and analysis methods have been proposed in this respect, together with comprehensive cooperation on an international basis in an effort to introduce satisfactory methods. This is evidenced by, among other things, a pamphlet entitled 'Sampling and Analysis of Copper Cathodes' compiled by British Non-ferrous Metals Federation. This pamphlet has been distributed, inter alia, to the world's copper producers, by the International Wrought Copper Council in August 1982, publication No. P82/279. The problems involved with copper-sampling have also been illustrated in a lecture entitled 'Copper Cathode Sampling in Scandinavia' given by the inventor at the ASTM Symposium on Sampling of Copper Cathodes held in Dallas, U.S.A. in November 1982.

Thus, by developing such methods, it is possible to produce general samples which could be said to be representative of selected cathode productions, and analysis can be made of these samples for use on behalf of the customer. These methods, however, are highly complicated and time consuming and are thus only capable of making a subsequent characterisation of a given production. Consequently, there is a great need for a method by which copper producers are able to monitor or control the quality of the copper produced more directly, and also which enables the quality level to be assessed more or less continually in the production of cathodes, during each working shift, thereby to indicate whether or not given lots of cathodes fulfill internal and/or external quality demands.

It has now been surprisingly found possible to determine and monitor in a particularly simple and rational manner with sufficient accuracy the quality level of separate bundles of cathodes, each comprising a plurality of cathodes stacked one upon the other.

Normally, the cathodes are delivered in the form of bundles containing 10-20 cathodes, the cathodes being held together by metal straps. Accordingly, the invention is characterised by the steps set forth in the following claims.

Thus, the quality of the copper in a cathode bundle, which may comprise two or more cathodes, but which normally comprises 10-20 cathodes, is assessed by determining the bulk density of the bundle, or by determining at least one value related to the bulk density. Bulk density is, today, the standardized designation of the ratio between the mass of a quantity of material and bulk volume, whereby bulk volume is meant the total volume of the solid material, plus the volume of the sealed and open pores present. The inverted value of the bulk density, which is sometimes called the bulk specific volume, can naturally also be used. It may also suffice to determine a value of which one of these magnitudes is a function. Examples of such values will be given below.

Thus, the bulk density is calculated from the relationship $m/V$, where m is mass and V is bulk volume. Since V can be calculated from the relationship $h \cdot A$ where h is the average height and A the area of a substantially parallelepipedic bundle of cathodes and A is, in this context, a constant for given cathodes (=cathodes area) similarily, if the mass m is constant for a given, constant number of cathodes in the bundle, h will constitute a value which is directly related to the bulk density. Another value which can be used to advantage under the same premise is the minimum useful active length of the metal strap around the bundle, the length of said strap also being related to h. The average height h of a cathode bundle can readily be determined manually, with the aid of a tape-measure or rule. If the cathodes are all stacked in the same direction, i.e. with the upper part of the cathode provided with the cathode hangers extending in the same direction in said cathode bundle, the height at the hanger end of the bundle would normally be greater than the height at the opposite end of the bundle. The value h is then determined simply as a purely arithmetic means of these two heights.

These measuring operations, however, can also be automized to advantage, by using conventional, modern distance-meters, for example, meters of the laser or ultrasonic type. By using at least two distance-sensing means, placed above a conveyor belt on which the cathode bundles are conveyed, it is possible to determine the value of h very quickly and very positively. In combination with, for example a belt scale which simultaneously register the mass of a cathode bundle, it is also possible to calculate directly the bulk density, thereby immediately obtaining a measurement of cathode quality for each cathode bundle passing the scale.

As will be understood, the afore-described automatized quality assessing operation can also be combined with a quality division of the production, if so desired or sought. This enables selective deliveries to be made to customers who place particular requirements on quality, for example, requirements promoted by certain additional production techniques and production assortments. The cathodes of lower quality, although within present-day quality standards, can be delivered to customers without such special requirements. Cathode bundles which are not considered to fulfill present-day quality standards, or which do not satisfy the qualities agreed upon, can be rejected and returned for re-smelting and refinement.

Figure 2:
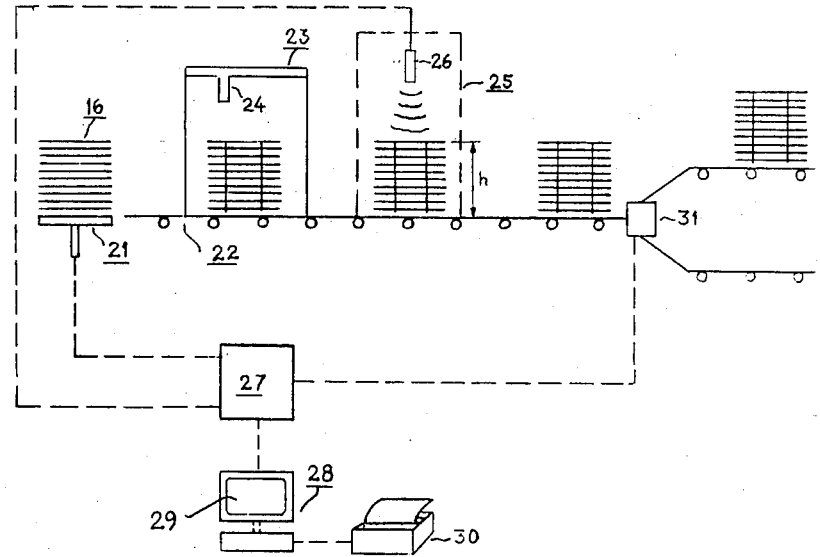

The invention will now be described in more detail with reference to drawings and an example. In the drawing FIG. 1 is a schematic view of a cathode and a bundle of cathodes, FIG. 2 is a block schematic diagram showing a preferred embodiment of the invention consisting of fully automized equipment for continually measuring and streaming possibilities. FIGS. 3 and 4 are diagrams showing statistical relationships described in the Example below.

In FIG. 1 there is illustrated a starting sheet 10 which consists of a copper metal plate 11 and two hangers 12 made of a copper strip and attached to the upper end of the copper plate 11. The starting sheet 10 is used as a cathode in an electolysis process. Subsequent to the given electrolysis process cycle, the former starting sheet 10, now designated as a cathode 13, is covered by a copper metal deposit layer 14. This layer 14 has a variable surface appearance, which has been indicated on the FIG. 1 by the line 15 defining the outer cathode surface. The surface may also contain nodules 15a. On the right side of FIG. 1 a bundle 16 of eighteen cathodes 13 is shown stacked one upon the other with the hangers 12 directed to the right. Around the bundle 16 a metal strap 17 is shown mechanically holding together the cathodes 13. Each bundle 16 may have two or more such straps 17.

FIG. 2 illustrates the different working phases of the preferred automized embodiment of the method according to the invention. The cathode bundle 16 is first shown being weighed on a conveyor scale 21. Subsequent to the weighing procedure the bundle 16 is transported by a roll conveyor 22 to a strapping station 23 with its strapping equipment 24. The strapped bundle 16 is then conveyed to a measuring station 25 with its bundle-height measuring device 26 of ultrasonic type or the like. The measuring device 26 determines indirectly the height h of the strapped bundle 16, by measuring the distance from the device to the upper part of the bundle 16. The distance from the device 26 to the conveyor 22 is constant and already known and programmed in a computer system 27, to which both the conveyor scale 21 and the measuring device 26 are electronically connected. The computer system 27 then calculates both density values, which values may be monitored on a computer terminal 28 having a display 29 and which are also printed out on a printer 30. The computer system 27 compares the calculated bulk density value for each cathode bundle with a given, pre-determined value. The system 27 is connected to a conveyor switching device 31. If the calculated bulk density is too low when compared with the given predetermined value, the computer 27 sends an error signal to the switching device 31, which causes the cathode bundle in question to be separated from the other bundles. In FIG. 2 there are indicated two different conveyors downstream of the conveyor switch, but it may of course also be desirable to divide up the production in more than two production streams.

EXAMPLE

Over a period of 10 months, measurements of the copper cathode production at Boliden Metall's tank house in accordance with the invention have been performed in order to determine the quality of the copper. In parallel herewith, corresponding samples have been taken from the same copper production, these samples being taken in order to determine the amount of impurities. In this respect, a so-called impurity number has been calculated, taking a starting point from the analysis of impurities present, primarily Ag, Bi, As, Sb, Pb, Ni, and Se. The impurity number is calculated for each of the element by calculating the relationship between contents determined by analysis and the lower limit detection of the analysis in question. It has been shown previously that an average of such impurity number for the above elements is representative as a quality measurement when compared with other conventional quality measurements, such as conductivity and recrystallization temperature, these latter measurements, however, in practice, only being suitable when sampling cast products.

Corresponding values of average impurity number and average bulk density of the cathode bundles have been plotted in the diagrams shown in FIGS. 3 and 4. FIG. 3 illustrates the weekly average in respect of average bulk density (ABD) as a function of the weekly average values in respect of the average impurity number (AIN). The impurity number is based on four cathodes selected at random from each days production, analysis samples having been prepared in accordance with local sampling routines. The bulk density has been determined for each cathode bundle, totalling 60 bundles per day, by measuring the height of each bundle with a carpenter's rule. An extremely good correlation was obtained, despite this rather rough measuring method. Corresponding values obtained for AIN and ABD, respectively, result in a straight line having a correlation coefficient $r=0.85$, which means that the straight-line relationship AIN-ABD has a significance of 99.9%.

FIG. 4 illustrates the relationship obtained between AIN and ABD when comparing daily average values. Corresponding values for AIN and ABD also result in a straight line. The correlation coefficient r has been calculated to 0.79, which assumes a significance of approximately the same magnitude as that for the relationship between the weekly average values.

Thus, the correlation between ABD and AIN, is very good, even with respect to average values, which have only been based on daily samples. In view of this, all further copper-quality checks on a continuous basis have been considered superfluous.

I claim:

1. A method for monitoring the quality of electrolytically produced copper cathodes affected by impurity content and surface structure without taking any copper sample, said method comprising: stacking copper cathodes to form a stacked bundle, ascertaining values related to the mass and stacked volume of said bundle for determining a value of bulk density of said bundle, or for determining a value derived from said bulk density, making a comparison of said determined value with predetermined known values, and determining the quality of said stacked copper cathode bundle from said comparison, whereby a determination as to whether the quality of said electrolytically produced copper cathodes in said copper cathode bundle meets a predetermined standard of quality may be made.

2. A method according to claim 1, including the step of applying at least one strap to bind said stack before making measurements for determining the stacked volume.

3. A method according to claim 2, including the step of measuring a mean height of a stacked cathode bundle and using said mean height to determine said stacked volume.

4. A method according to claim 3, including the step of using distance-measuring means placed above a path of movement of a cathode bundle, for measuring the mean height of said bundle.

5. A method according to claim 4, wherein the step of using distance-measuring means comprises using distance-sensing means of a laser or ultrasonic type measuring means.

6. A method according to claim 1, including the step of measuring a mean height of a stacked cathode bundle and using said mean height to determine said stacked volume.

7. A method according to claim 6, including the step of using distance-measuring means placed above a path of movement of a cathode bundle, for measuring the mean height of said bundle.

8. A method according to claim 7, wherein the step of using distance-measuring means comprises using distance-sensing means of a laser or ultrasonic type measuring means.

* * * * *